(12) United States Patent
Fest, Sr. et al.

(10) Patent No.: US 9,054,725 B1
(45) Date of Patent: Jun. 9, 2015

(54) SIGNAL OR LOOP POWERED AUTOMATIC MULTICOLOR DISPLAY AND CONTROLLER

(71) Applicants: Otto P. Fest, Sr., Tucson, AZ (US); Noel Smith, Tucson, AZ (US)

(72) Inventors: Otto P. Fest, Sr., Tucson, AZ (US); Noel Smith, Tucson, AZ (US)

(*) Notice: Subject to any disclaimer, the term of this patent is extended or adjusted under 35 U.S.C. 154(b) by 67 days.

(21) Appl. No.: 14/087,501

(22) Filed: Nov. 22, 2013

Related U.S. Application Data

(60) Provisional application No. 61/855,422, filed on May 15, 2013.

(51) Int. Cl.
   G08B 3/00       (2006.01)
   G08B 5/00       (2006.01)
   H03M 1/10       (2006.01)
   G08B 5/36       (2006.01)

(52) U.S. Cl.
   CPC .............. H03M 1/1076 (2013.01); G08B 5/36 (2013.01)

(58) Field of Classification Search
   CPC .......... B60K 35/00; B60K 37/02; G08B 5/36; G08B 5/38; H02H 9/00; H03K 17/687; H04B 1/04; H04B 1/02; G03B 21/00; G03B 21/02; H04L 12/10; H04L 12/40045
   USPC .............. 340/691.6, 691.8, 635, 636.12, 657; 324/119, 120, 126, 142; 361/18, 79; 702/60, 64; 307/125, 131
   See application file for complete search history.

(56) References Cited

U.S. PATENT DOCUMENTS

| | | | |
|---|---|---|---|
| 4,189,765 A * | 2/1980 | Kotalik et al. | 700/83 |
| 4,908,569 A | 3/1990 | Fest | |
| 5,077,486 A | 12/1991 | Marson et al. | |
| 5,220,681 A * | 6/1993 | Belgin | 455/156.1 |
| 6,018,700 A | 1/2000 | Edel | |
| 6,285,094 B1 | 9/2001 | Fest, Sr. | |
| 7,626,378 B1 | 12/2009 | Fest | |
| 2004/0254750 A1* | 12/2004 | Macfarlene et al. | 702/61 |
| 2007/0035707 A1* | 2/2007 | Margulis | 353/122 |
| 2011/0090604 A1* | 4/2011 | Butler | 361/18 |

* cited by examiner

Primary Examiner — Hung T Nguyen

(57) ABSTRACT

The present circuitry provides for an expansion of loop powered technology preferably employed on 4-20 mA. The invention provides for extracting energy from current loops for use in displays, alarms, controls and communication. Further, the circuit allows for a reporting of instrument status and loss of signal to eliminate operator error in assuming the meter is faulty when in actuality a loss of signal has occurred.

15 Claims, 4 Drawing Sheets

SIGNAL OR LOOP POWERED AUTOMATIC MULTICOLOR DISPLAY AND CONTROLLER

CROSS REFERENCE

This application claims the benefit of provisional patent application Ser. No. 61/855,422, filed May 15, 2013, the disclosure of which is incorporated in its entirety herein by reference.

BACKGROUND OF THE INVENTION

Loop powered technologies are well known in the art and include: U.S. Pat. No. 6,285,094, entitled "Loop-Powered Current-Loop Controller", issued to Fest on Sep. 4, 2001; U.S. Pat. No. 7,477,080 entitled "Current Loop Powered Isolator", issued to Feast on Jan. 13, 2009; and, U.S. Pat. No. 7,684,768 entitled "Loop Powered Current-Loop Transmitter", issued to Fest on Mar. 23, 2010; all of which are incorporated hereinto by reference.

SUMMARY OF THE INVENTION

The present circuitry provides for an expansion of loop powered technology preferably employed on 4-20 mA. The invention provides for extracting energy from current loops for use in displays, alarms, controls and communication. Further, the circuit allows for a reporting of instrument status and loss of signal to eliminate operator error in assuming the meter is faulty when in actuality a loss of signal has occurred.

Further, the circuit provides for exceptional reporting for machinery and computerized supervisory control systems without requiring external power other than the one already in existence in a 2-wire current loop application.

DETAILED DESCRIPTION OF PREFERRED EMBODIMENTS

A primary embodiment of the present invention consists of a signal or loop powered controller, which is electrically isolated between the input and output portions of the circuit. The controller measures an input signal from an input current loop and transmits an output signal over an optical isolator, to a desired output current loop. This allows for speedy automatic control of electrical systems. The invention additionally has a bargraph display which allows easy observation of the signal level and a failure alarm which will alert the user to when the input signal power is failed.

Figure 4:
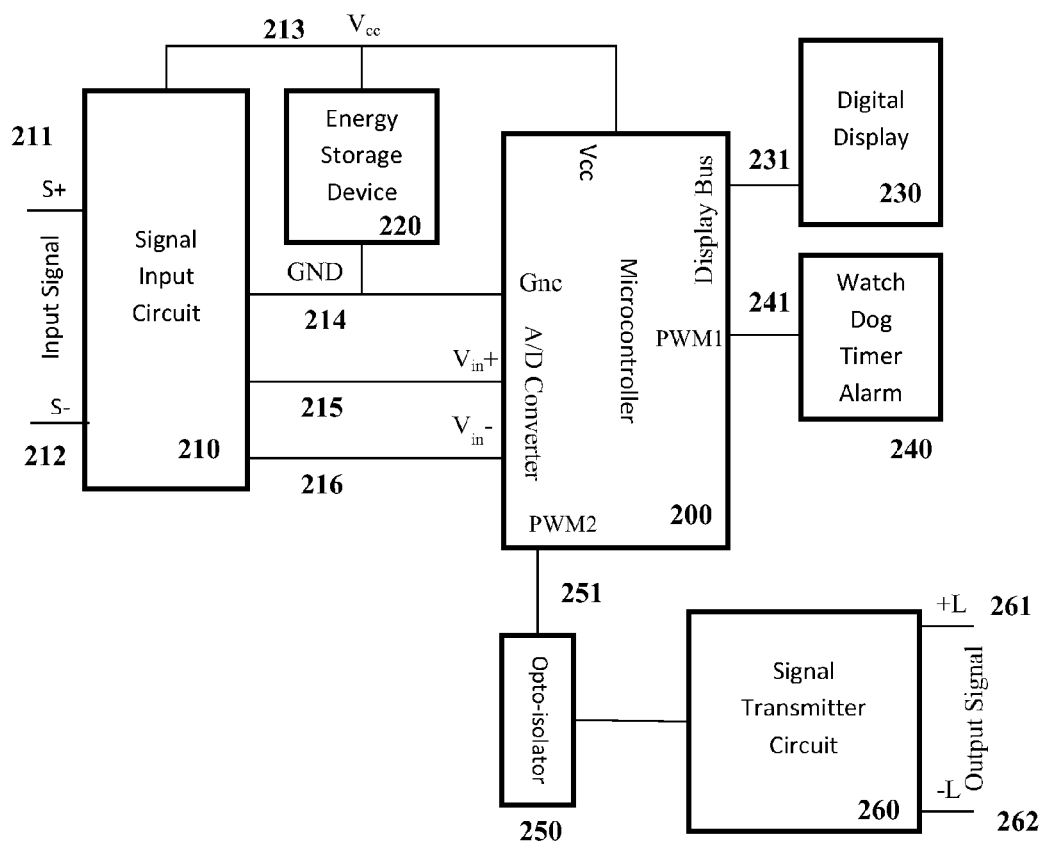
FIG. 4 depicts a system schematic for the present invention

As shown in FIG. 4, the invention uses a microcontroller (200) to generate a pulse-width modulated output that is sent to an optical isolator (250) that separates input and output halves of the controller. The input half has a loop powered signal input circuit (210), which generates a power supply for a microcontroller and converts the input signal into a positive signal for input to the A/D converter. The power supply also charges an energy storage device (220), which supplies power to the microcontroller when no loop or signal is present. The microcontroller receives the converted input signal and generates at least two outputs: a constant pulse output which is connected to a watch dog timer alarm that is triggered if and when the pulse ceases, and a pulse width modulated control signal output, which is determined based on the input signal and is sent to the optical isolator. The microcontroller also controls a digital display, which may be a bargraph display. The optical isolator is connected to the signal transmitter circuit (260), which is powered from a current loop of the device being controlled.

In the present embodiment, an input signal (211, 212) Is supplied to the controller, the signal input circuit uses the current provided by the input signal to generate a voltage (213) as well as a ground (214) that powers the microcontroller and the input circuit. This same voltage charges the energy storage device, which delivers power to the microcontroller (200) when an input signal is not present. The input signal (211, 212) Is linearly transformed by the input signal circuitry into an intermediate signal (215, 216) which is always positive relative to the A/D ground, and input to the A/D converter of the microcontroller. The microcontrollers controls the display bus (231) to generate a representation of the signal measurement on the digital display (230), as well as a constant pulse (241) that is output to the watch dog timer (240) on a pulse-width modulated output. When the microcontroller detects a failure of the input signal, or when the microcontroller is no longer powered, it stops sending the constant pulse output, whereupon the watch dog timer alarm is triggered. The microcontroller also outputs a pulse-width modulated signal (251) representing the signal measurement to the optical isolator (250), which acts as an isolation barrier that electrically separates the input signal circuit (210) from the transmitter circuit (260). The optical isolator acts as a switch in the transmitter circuit, which opens and closes as the pulse width modulated signal is sent to the optical isolator, whereupon the signal is averaged by the output signal and returned to the output current loop (261, 262) as a current proportional to the signal level.

Figure 1:
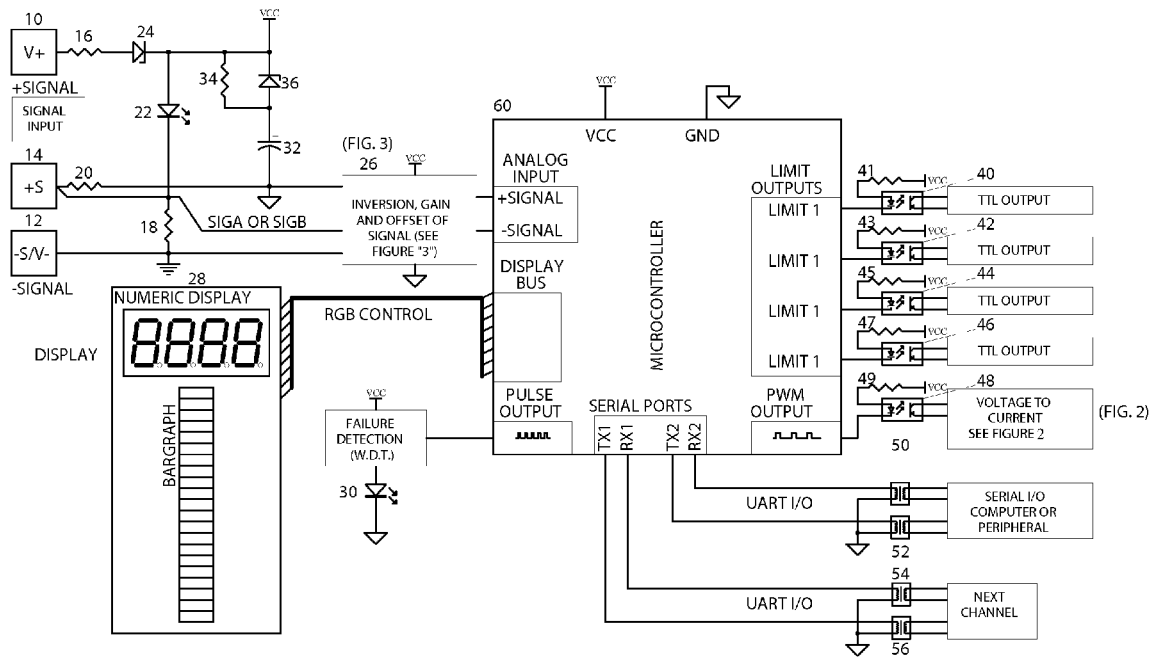
FIG. 1 depicts the schematic diagram of the preferred embodiment of the Loop Powered Meter/Controller according to the present invention.

Referring to FIG. 1, it is important to note that, similar to an analog meter, the subject invention is powered by the signal it measures whether it is Voltage or current (DC or AC) or current loop in nature as long as the signal can supply enough energy (>5 mW at present) to power the invention.

Input Voltage Signal Measurement Description:

The most positive voltage is applied at terminal 10. The most negative voltage is applied at terminal 12; terminal 14 is connected to terminal 10. Resistor 16 protects LED 22 from over-voltages and allows it to clamp the input voltage to a level acceptable (VCC) by the componentry. Resistors 20 and 18 form a voltage divider for the internal analog to digital converter (A/D) of microcontroller 60 to measure and convert to digital format.

Resistor 16 also serves as a current limiter when measuring voltage. When measuring currents, its value is zero (0) Ohms. Rectifier 24 serves two purposes, it prevents reverse polarity being applied to the circuitry only allowing positive (+) polarity in direct current measurements and #2, it rectifies the A.C. input signal to power the electronics in conjunction with LED 22 that regulates it. Because the total power of the subject invention is a few milli Watts, a half wave rectified power supply filtered by ESD 32 is sufficient for reliable operation.

Input Current Signal Measurement Description:

The positive (+) loop is applied to terminal 10 and the negative (−) loop to terminal 12. The voltage drop across LED 22 sets the VCC magnitude for the circuitry and also indicates that the loop is "On," resistor R18 shunts the loop current to convert it to voltage for A/D conversion by microcontroller 60. The invention has provisions for external power for measurements of signals too small to power the electronics. In this case, V+ is applied at terminal 10, V− at terminal 12 and + signal at terminal 14 with − signal common to V-terminal 12. Resistors R20 and R18 attenuate the signal for A/D conversion.

The above explanations are the only difference between voltage signal power and current signal power. All else is common for both operations. Resistor 34 limits the current into ESD (Energy Storage Device) 32 while the system is operating under normal conditions. ESD 32 serves two purposes, first it filters and averages A.C. when measuring A.C. signals, and second, should the signal input fail, the charge on ESD 32 will power the electronics via diode 36. Diode 24 will prevent the ESD 32 from discharging into the source should a short circuit occur at its input terminals 10 and 12. The charge in ESD 32 is of sufficient magnitude to allow uC 60 upon detection of a lack of signal at the junction of items 18 and 20 to arm its failure detect LED 30 to flash a warning on its display and transmit a distress message via its serial port isolators 50 to supervisory equipment and local alarms via isolators 40, 42, 44 and 46, which can be any opto-isolated (or not) electronic switch such as transistors, SCR, triacs or solid state relays, as well as lamps, etc. Resistors 41, 43, 45, 47 & 49 limit the current into the LED of isolators 40-48 respectively.

Signal inversion and correction circuitry 26 also contains manual zero and span adjustments for ease of calibration in place or in addition to the serial input algorithm for calibration. The inversion scheme is necessary to allow the A/D of uC 60 to operate above (+) and below (−) its ground (Vss) level without the use of DC-DC converters.

The several algorithms written into uC 60 allows the uC to drive the displays (digits and bargraph) item 28 in a multitude of fashions including, multicolor using RGB (red, green and blue) LEDs. The firmware also allows for driving dot matrix graphic displays only limited by uC 60 output ports available and its firmware.

The present invention includes isolated multichannel scanning via isolators 54 and 56, such as used in triple redundant controllers as well as current loop retransmission item 48. The above is representative of the flexibility of the invention and it is not intended to show or limit the scope of the invention but on the contrary, to demonstrate the unlimited applications of the invention only limited by the knowledge of the designer and the capabilities of the hardware available.

Figure 2:
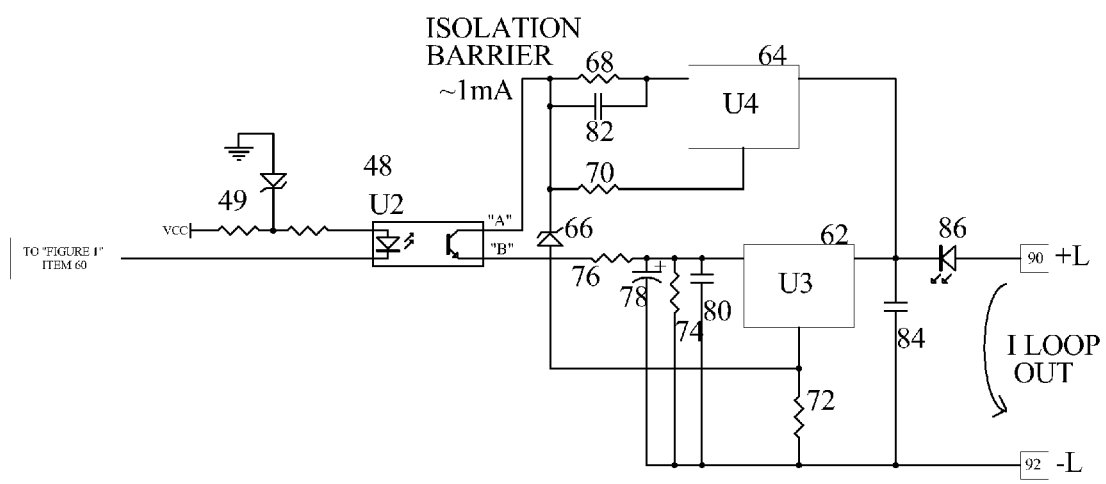
FIG. 2 depicts the schematic diagram of the preferred embodiment of the retransmission section to the present invention.

In FIG. 2, the written algorithm into uC 60 contains a PWM (Pulse Width Modulation) module that drives isolator 48 at its inputs. The output of isolator 48 is excited by a constant current and constant voltage scheme that ensures*an accurate and constant 1:1 transfer ratio to the V-I (Voltage to Current) transmitter 62. Constant current source 64 supplies a parasitic ~1 mA of transmitter section current that is clamped to a constant voltage by Zener diode 66. In a preferred embodiment, the values of the resistor 72 and input voltage is selected so that the voltage at "A" is always higher than the voltage at the resistor 72, which prevents current from flowing through the Zener diode and maintains a constant voltage drop across it. The constant current of 64 is determined by the ratio of resistors 68 and 70.

It is important to note that any excess currents produced by 64 are summed to the total output current of 62 to avoid non-linearity. This is accomplished by the connection of zener diode 66 to V-I converter 62 at its junction with resistor 72, which itself is part of the ratio between it and resistor 74 that determines the gain of 62. When the PWM signal of isolator 48 is converted to variable voltage by the current of 64 at point "A," transferred to point "B" by isolator 48 and averaged by resistor 76 and capacitor 78 closing the circuit for smooth current transmission output at terminals 90 (+) and 92 (−) allowing the transmitter to drive loads in a "source" or "sink" fashion. Capacitors 80, 82 and 84 filter glitches that might be caused by load changes and/or PWM steps. LED 86 serves two purposes, first it prevents reverse voltage from damaging the transmitters 62 and 64, and secondly, it visually indicates proportionally the current flow at the transmitter's output.

Figure 3:
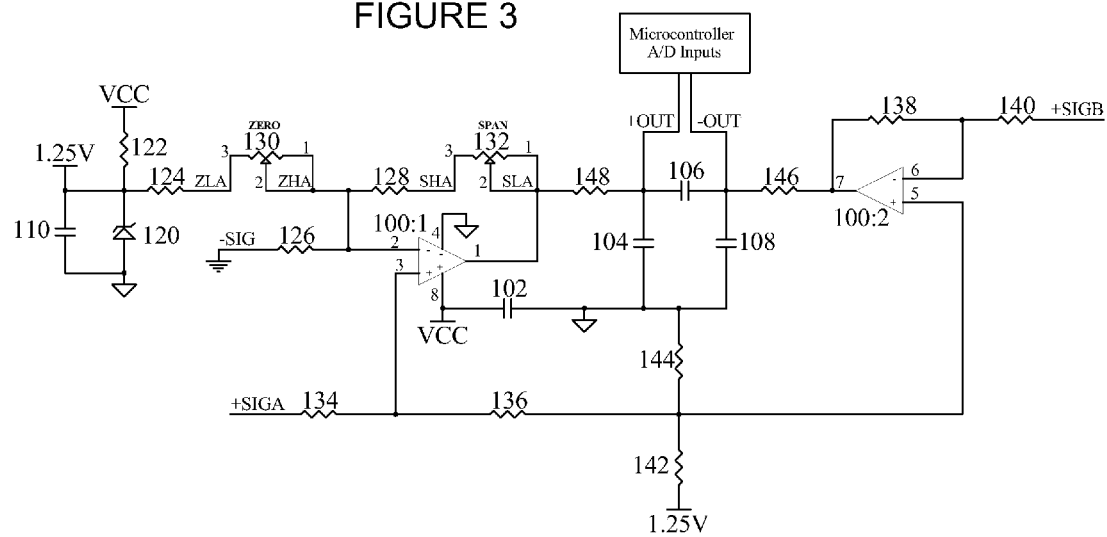
FIG. 3 depicts the schematic diagram for the preferred embodiment of the signal inversion, gain and offset circuit of the present invention.

FIG. 3 shows the circuitry for the signal inversion, offset and gain circuit (26). Analog to digital converters embedded in micro-controllers are known for being limited to unipolar and ground referenced inputs, forcing designers to utilize DC-DC converters and additional hardware to achieve desired high accuracy bipolar or floating signal operation. The embodiment includes a unique scheme to overcome those limitations of low-cost standard micro-controllers with embedded A/D. It's worthwhile to note that this novel configuration allows the A/D to process unipolar negative or positive signals with reference to micro-controller ground, as well as bipolar differential signals, without DC-DC converters or absolute value amplifier techniques.

Power is supplied at VCC by the same voltage drop across LED 22 in FIG. 1. Capacitors 102 through 110 are used as by-pass filters on power and signal lines. Voltage reference 120 provides the 1.25V references for the amplifiers 100:1 & 100:2 inputs through resistors and potentiometers 122 through 132 and 142. Potentiometers 130 & 132 allow for manual zero and span adjustments of the output signal to the A/D at +Out and −Out. Resistors 146 & 148 balance the impedances into the A/D inputs.

Negative inputs with reference to A/D ground are applied to amplifier 100:1 at Pin 2 (−) that forms a summing junction with resistors 126, 130 & 128. In this case, resistors 136 & 138 are zero (0) Ohms and resistors 134 & 140 are not used. For positive signals, resistor 126 is grounded and positive (+) input is applied either at +Signal A through resistor 134 whose value is the same as resistor 136, forming a divider into amplifier 100:1 positive (+) Input or at resistor 140 (+Signal B), which determines the gain of amplifier 100:2 with resistor 138. For bipolar and differential signals, inputs are applied at resistor 134 (A) and resistor 140 (B). Amplifier 100:1 and associated zero & span circuitry retain the manual adjustments.

The inversion gain and offset circuit may be configured differently depending on the user's needs. The signal that is developed across resistor 18 is the signal input for the circuit, and when current is nominally flowing in the positive direction the signal is typically negative. For unipolar signals, the −S/−V line in FIG. 1 is connected to the −SIG line in FIG. 3, while the +S line is connected to either +SIGA or +SIGB. For bipolar signals the +S line is connected to +SIGA and the −S/−V line is connected to the +SIGB input.

The choice of resistor values in the inversion, gain, and offset circuit must be carefully considered to ensure that both signals remain positive relative to the A/D ground.

Care must be taken in the layout of the componentry to avoid crosstalk and stray capacitances from disturbing the quality of the signal due to high frequency operation of the micro-controller.

Referring to FIG. 1, the microcontroller may also be equipped with one or more UART (serial) outputs, which can be used to communicate with a computer or peripheral device, which can be electrically isolated from the circuit using transformer isolators (50, 52, 54, 56).

Referring to FIG. 1, the microcontroller may also be equipped with limit outputs, which may be connected to external circuits or devices via additional optical isolators (40, 42, 44, and 46). The optical isolators allow the microcontroller to communicate with other electronic circuits or devices using TTL logic. For each limit output a resistor (41, 43, 45, and 47) limits the current that can flow into the optical isolator input. The optical isolator allows the controller to remain electrically isolated from other circuits.

The above described novel circuitry eliminates the need for generating a negative supply and absolute value amplifiers when inputting bipolar/differential signals into generic A/D in micro-controllers.

The invention provides for a variety of uses obvious to those of ordinary skill in the art, including, but not limited to:
A: A loop powered (powerless) bargraph-digital meter.
B: An isolated loop powered input and externally powered bar-digital controllers.
C: An isolated A.C. signal powered (powerless) meter in conjunction with the referenced patents.
D: An isolated input to output (I/O) loop/signal powered bar-meter with isolated outputs bases with the referenced patents.
E: An isolated serial I/O or analog input signal 4-20 mA transmitter/controller (alarms) with bargraph or digital display.
F: A second version illuminates multicolor 15 segment (Alphanumeric) display instead of multicolor bargraph, The alphanumeric display is capable of communicating to operators directly (serially or by the signal) avoiding operator errors of interpretations.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, descriptions of the inventions described herein using the phrase "comprising" Includes embodiments that could be described as consisting of, and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A signal powered controller, with failure detection ability and a digital display, capable of measuring an input signal from an input current loop and transmitting the signal over an optical isolator, to a desired output current loop, the controller comprising:
   a. a signal input circuit (210), configured to generate a power supply for the controller from the input signal, operatively connected to a microcontroller and an energy storage device;
   b. the energy storage device (220), configured to supply power to the microcontroller when no loop or signal is present, operatively connected to the microcontroller;
   c. the microcontroller (200), comprising:
      i. an analog-to-digital converter, operatively connected to the signal input circuit, having at least one input for an analog signal;
      ii. a first pulse width modulated output, operatively connected to an optical isolator, configured to generate a pulse-width modulated version of the input signal;
      iii. a second pulse width modulated output; and
      iv. a display bus;
   d. the optical isolator (250), operatively connected to a signal transmitter circuit; and
   e. the signal transmitter circuit (260), configured to draw power from the output current loop;
wherein when an input signal (211, 212) is supplied to the controller, the signal input circuit uses the current provided by the input signal to generate a voltage (213) as well as a ground (214) that powers the microcontroller and the input circuit, whereupon the voltage charges the energy storage device, whereupon the energy storage device (220) delivers power to the microcontroller (200) when a input signal is not present, whereupon the input signal (211, 212) is linearly transformed by the input signal circuitry into an intermediate signal (215, 216) which is positive with respect to the A/D ground, and input to the analog-to-digital converter of the microcontroller, whereupon, the microcontroller detects the intermediate signal and generates a signal measurement,
whereupon the microcontroller outputs a pulse-width modulated signal (251) representing the signal measurement to the first pulse-width modulated output,
whereupon the pulse-width modulated version of the signal is transmitted to the optical isolator (250), which acts as an isolation barrier that electrically separates the input signal circuit (210) from the transmitter circuit (260),
whereupon the optical isolator acts as a switch in the transmitter circuit, which opens and closes as the pulse width modulated signal is sent to the optical isolator,
whereupon the transmitter circuit generates a corresponding output signal based upon the signal received by optical isolator, which is transmitted to the output current loop (261, 262).

2. The controller of claim 1, where the controller additionally comprises a digital display (230) operatively connected to the display bus of the microcontroller, whereupon the microcontroller controls the display bus (231) to generate a representation of the signal measurement on the digital display (230), where the digital display may be a bargraph display, an LCD display, or a numerical display, or any other mechanism for displaying a measurement known to one of ordinary skill in the art.

3. The controller of claim 1, where the controller additionally comprises a watch dog timer alarm (240), operatively connected to the second pulse width modulated output, whereupon the microcontroller generates a constant pulse (241) that is output to the watch dog timer (240), whereupon, when the microcontroller detects a failure of the input signal, or when the microcontroller fails, it stops sending the constant pulse output, whereupon the watch dog timer alarm is triggered.

4. The controller of claim 1, where the loop-powered signal input circuit comprises:
   a. a positive signal input terminal (14);
   b. a negative signal input terminal (12);
   c. a first resistor (16), which protects the current from excessive input voltages;

d. a first Zener diode (24), connected to the first resistor, which prevents current from flowing back towards the positive input terminal;
e. a second resistor (20), connected to the positive signal input terminal (14), which forms the first half of a voltage divider for the input signal;
f. a third resistor (18), connected between the second resistor (20) and the negative signal input terminal (12), which forms the second half of a voltage divider;
g. an LED (22), which generates a voltage drop that acts as the power and ground for the input circuit and the microcontroller (60), comprising:
  i. a positive terminal, connected to the positive power input terminal (10) via the first Zener diode, and to the power input of the microcontroller; and
  ii. a negative terminal, connected to the output of the voltage divider formed by the second and third resistors, and to the ground input of the microcontroller;
  wherein the positive terminal of the LED acts as the power line for the microcontroller and input circuit, and wherein the negative terminal of the LED acts as the ground line of the microcontroller and input circuit, wherein the LED light indicates that the signal is powered;
h. a fourth resistor (34), connected to the positive terminal of the LED, and the positive terminal of the energy storage device (32), which acts to regulate the current flowing into the energy storage device;
i. a diode (36), connected in parallel to the fourth resistor which allows current to flow freely back from the energy storage device; and
j. a signal inversion gain and offset circuit (26), having positive and negative signal inputs, and positive and negative signal outputs connected to the positive and negative signal inputs of the microcontroller;
wherein, when a signal is applied to the circuit, a voltage is developed across the LED which charges the energy storage device and powers the microcontroller, wherein the Zener diode (24) rectifies the input voltage and prevents reverse current from being applied to the circuit, wherein, when a signal is applied to the circuit, the third resistor converts the loop current to a voltage signal across the third resistor, wherein the voltage signal is inverted, amplified and offset by the signal inversion gain and offset circuit, whereupon the signal is transmitted to the microcontroller A/D converter.

5. The current-loop controller of claim 4, where the positive signal input terminal (14) is connected to the first resistor, such that the input signal is rectified by the Zener diode and is used to power the circuit.

6. The current-loop controller of claim 4, where the circuit additionally comprises a positive power terminal (10) which is connected to an external power supply, where the positive power input terminal is connected to the first resistor (16), for use when the input signal level is too low to power the circuit.

7. The loop-powered controller of claim 1, where the loop-powered signal transmitter circuit comprises:
a. a positive loop input terminal (90);
b. a negative loop input terminal (92);
c. a LED (86), connected to the positive loop input terminal, which indicates when a positive loop current is present, and prevents a reverse current from flowing;
d. the optical isolator (48), which is the same optical isolator as in claim 1 (250), comprising:
  i. an "A" terminal;
  ii. a "B" terminal; and
  iii. an input terminal, operatively connected to the second pulse width modulated signal from the microcontroller;
wherein the input terminal acts as a switch that opens and closes the path from the "A" terminal to the "B" terminal, under the control of the pulse-width modulated signal from the microcontroller;
e. a first constant current source (64), comprising:
  i. a first terminal, connected to the positive loop input terminal via the LED;
  ii. a second terminal connected to a first resistor;
  iii. a third terminal connected to a second resistor;
wherein the first and second resistors determine the current generated by the current source;
f. the first (70) and second (68) resistors, which control the current generated by the first current source, which are connected to the "A" terminal of the optical isolator;
g. a second constant current source (62), comprising:
  i. a first terminal, connected to the positive loop input terminal via the LED;
  ii. a second terminal, connected to a third resistor; and
  iii. a third terminal, connected to a fourth resistor;
wherein the third and fourth resistors determine the current generated by the current source;
h. the third (72) and fourth (74) resistors, which set the current of the second current source, which are connected to the negative loop input terminal (92);
i. a Zener diode (66), connected between the Junction of the second current source and the third resistor (72), and the "A" terminal of the optical isolator, which clamps the voltage at the "A" terminal or the optical isolator to a constant voltage;
j. a fifth resistor (76), connected to the "B" terminal of the optical isolator;
k. a first capacitor (78), connected between the fifth resistor and the negative loop input terminal, where the fifth resistor and the first capacitor form an averaging filter that averages the voltage signal received from the optical isolator, where the value of the first capacitor determines the time constant of the averaging filter;
l. a second capacitor (82), connected in parallel to the second resistor (68), used to filter glitches;
m. a third capacitor (80), connected in parallel to the fourth resistor (74), used to filter glitches; and
n. a fourth capacitor (84), connected between the positive and negative loop input terminals, used to filter glitches;
wherein the positive loop input terminal (90) Is used to supply current to the two current sources (62, 64),
wherein the first current source (64) supplies a small parasitic current to the optical isolator (48),
wherein the second current source (62) supplies a constant current that is returned to the negative loop input terminal (92),
whereupon when the microcontroller (60) transmits a pulse width modulated optical signal to the optical isolator (48), the optical isolator opens and closes the path between the "A" and "B" terminals of the isolator, allowing the parasitic current to flow through the optical isolator to the averaging filter formed by the fifth resistor (76) and first capacitor (78), whereupon the signal is averaged to produce a constant voltage, proportional to the pulse width of the optical signal, whereupon the voltage generates an additional current that flows through the fourth resistor (74) to the negative loop terminal (92), thereby resulting in a varying current at the output, where the current varies in proportion to the pulse-width modulated signal sent by the microcontroller.

8. The current-loop controller of claim 4, where the signal inversion gain and offset circuit comprises:
   a. a first operational amplifier (100:1), configured to act as either an inverting amplifier circuit, or a non-inverting amplifier circuit;
   b. a second operation amplifier (100:2), configured to act as an inverting amplifier;
   c. a negative signal input (−SIG), connected to the negative input terminal of the first operational amplifier, via a configurable first resistor;
   d. the first resistor (130);
   e. a positive A signal input (+SIGA), connected to the positive input terminal of the first operational amplifier via a configurable second resistor, and the positive input terminal of the second operational amplifier via a third resistor;
   f. the second resistor (134);
   g. the third resistor (136);
   h. a positive B signal input (+SIGB), connected to the negative input terminal of the second operational amplifier via a configurable fourth resistor;
   i. the fourth resistor (140);
   j. a Zener diode (120), which sets a reference voltage, connected to the power supply voltage of the circuit via a fifth resistor, and to the ground line of the input circuit;
   k. the fifth resistor (122);
   l. a first potentiometer (130), connected to the reference voltage via a sixth resistor, which allows the reference voltage at the first operational amplifier input to be adjusted;
   m. the sixth resistor (124);
   n. a second potentiometer (132), connected to the negative terminal of the first operational amplifier via a seventh resistor and to the output of the first operational amplifier, which permits the gain of the first operational amplifier to be adjusted;
   o. the seventh resistor (128);
   p. at least one capacitor acting as a by-pass filter;
   q. an eighth resistor (138), connected to the negative input terminal of the second operational amplifier, and the output of the second operational amplifier, where the eighth and fourth resistors determine the gain of the second operational amplifier circuit; and
   r. a ninth (142) and tenth (144) resistor, which form a voltage divider with respect to the reference voltage and ground, connected to the positive input of the second operational amplifier;

wherein the voltage drop across the LED in the input circuit sets the high and low voltage for both amplifiers, wherein the voltage generated by the input circuit passes through the fifth resistor and the Zener diode, whereupon the Zener diode generates a reference voltage, wherein the reference voltage is connected via the sixth resistor and the first potentiometer to the negative terminal of the first operational amplifier, wherein the reference voltage is also connected to a voltage divider formed by the ninth and tenth resistors, where the voltage set by the voltage divider is connected to the positive input of the second operational amplifier.

9. The current loop controller of claim 8, wherein the negative loop input signal is connected to the negative signal input (−SIG) of the inversion gain and offset circuit, wherein the positive A and B signal input terminals of the signal inversion gain and offset circuit are left floating, wherein, as a result, the first operational amplifier acts as an inverting amplifier of the negative signal input, wherein the first resistor, second potentiometer and seventh resistor determine the gain of the inverting amplifier, wherein the reference voltage adds an offset to the inverting amplifier circuit, wherein the third and eighth resistors are zero, whereupon when a signal is input to the negative signal input it is inverted, offset, and amplified by the inverting amplifier circuit, and input to the first A/D input of the microcontroller.

10. The current loop controller of claim 8, wherein the positive loop input signal is connected to the positive signal A input of the inversion gain and offset circuit, wherein the negative signal input of the inversion gain and offset circuit is left grounded, wherein the second and third resistors have the same value, forming a divider into the positive input of the second inverting amplifier, wherein the first operational amplifier acts as a non-inverting amplifier circuit, wherein the second potentiometer, seventh resistor, and first resistor determine the gain of the non-Inverting amplifier circuit, wherein the first potentiometer and sixth resistor allow the reference voltage to be used to set a configurable offset for the non-inverting amplifier circuit, whereupon, when a signal is input to the positive signal A input of the circuit, the signal is amplified and offset by the non-inverting amplifier circuit and output to an A/D input of the microcontroller.

11. The current loop controller of claim 8, wherein the positive loop input signal is connected to the positive signal B input of the inversion gain and offset circuit, where the second operational amplifier forms an inverting amplifier circuit, with an offset determined by the reference voltage via the voltage divider formed by the ninth and tenth resistors, where the signal is amplified by the second operational amplifier circuit, where the output of the inverting amplifier circuit is input to an input of the A/D converter on the microcontroller.

12. The current loop controller of claim 10, where the positive loop input signal is connected to the signal inversion gain and offset circuit positive A input terminal and the negative loop input signal is connected to the signal inversion gain and offset circuit positive B input terminal, where the first signal is amplified by the first non-inverting amplifier circuit, and is output to the and the second signal is inverted and amplified by the second inverting amplifier circuit, where the resulting signals are fed to two inputs of the A/D converter on the microcontroller, respectively.

13. The current loop controller of claim 8, where additional resistors are used to balance the impedances into the A/D converter pins of the microcontroller.

14. The controller of claim 1, where the microcontroller additionally comprises at least one serial output, where the serial output is operatively connected to a serial I/O computer or peripheral device.

15. The controller of claim 1, where the microcontroller additionally comprises at least one limit output, operatively connected to an additional optical isolator, where the limit output is used to communicate using TTL logic with other circuits or devices.

* * * * *